Aug. 7, 1934.   M. MALLORY   1,969,228
AIR INLET DEVICE
Filed May 18, 1931

Inventor
Marion Mallory
By Owen & Owen
Attorneys

Patented Aug. 7, 1934

1,969,228

UNITED STATES PATENT OFFICE 1,969,228

AIR INLET DEVICE

Marion Mallory, Toledo, Ohio, assignor to The Mallory Research Company, Toledo, Ohio, a corporation of Delaware Application May 18, 1931, Serial No. 538,186

1 Claim. (Cl. 137—153)

This invention relates to an air inlet device including a valve adapted to admit air between the throttle valve and the intake port of a gasoline engine under certain conditions, as for example, when the engine is operating at comparatively high speed with the throttle partly or wholly closed. This results not only in a saving of gasoline by increasing the percentage of air in the mixture when a comparatively lean mixture is desirable, but also increases the efficiency of the engine by increasing the compression at high speeds. It also has an effect in some degree similar to free wheeling in that it relieves the retardant effect upon the engine caused by the presence of a high degree of vacuum in the intake manifold.

The objects of the present invention are to improve the construction of the valve and of the elements controlling its operation so that it will operate smoothly without fluttering and also to provide means for adjusting the same so that it may be adapted for use with engines of different characteristics pertaining to cylinder capacity, compression, timing of the engine valves, etc.

The characteristic features of the invention, in its preferred form, will be more particularly described in connection with the accompanying drawing, in which—

Figure 1:
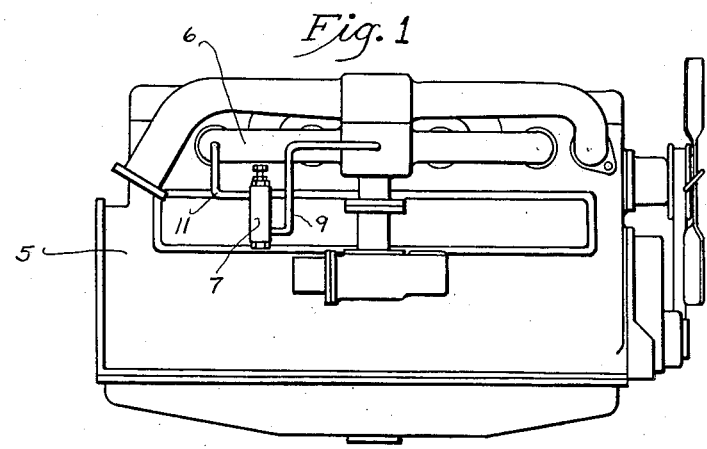
Figure 1 is a side elevation of a portion of a gasoline engine with the invention applied thereto.
Figure 2:
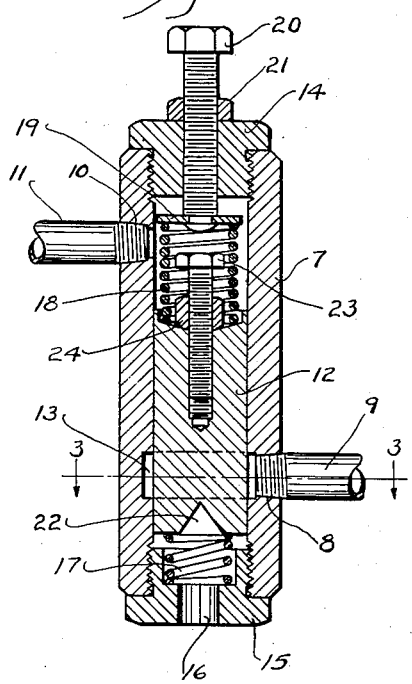
Figure 2 is a central longitudinal section on an enlarged scale of the valve and valve casing.
Figure 3:
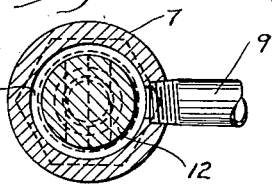
Figure 3 is a section taken on the line 3—3 of Fig. 2.

As illustrated in the drawing, the invention is associated with a gasoline engine 5 having an intake manifold 6. The valve casing 7 is preferably in the form of a cylinder having near its lower end a port 8 connected by a conduit 9 to some point in the fuel passageway between the throttle valve in the carburetor and the intake ports of the engine, the preferred point of connection being at or near the center of the intake manifold. The valve casing 7 near its upper end is provided with a port 10 which is connected by a conduit 11 to some point in the intake manifold at an appreciable distance from the connection of the conduit 9. The valve 12 is in the form of a piston reciprocable within the casing 7 and normally in a position to cover the port 8 when the engine is idle. There is a channel 13 extending around the inside of the casing 7 adjacent the port 8 to provide a relief for the piston 12 so that a suction through the conduit 9 will not under any circumstances cause the valve to stick. The casing 7 is provided with heads 14 and 15 at its upper and lower ends respectively. The bottom head 15 is provided with a port 16 adapted to admit air to the conduit 9 whenever the valve 12 is raised.

It will be understood that when the engine is operating at a comparatively high speed, particularly if the throttle is partly or wholly closed, the suction developed by the engine will through the conduit 11 be communicated to the upper part of the valve casing 7, tending to raise the valve 12 and admit air through the conduit 9 to relieve the high degree of vacuum in the manifold and to reduce the amount of gasoline which is drawn into the same. A coil spring 17 seated in the bottom of the casing 7 normally holds the valve 12 away from the head 15 and acts as a cushion when the valve 12 is lowered upon a reduction in the speed of the engine. A spring 18 in the upper part of the casing 7 offers increasing resistance to the upward movement of the valve 12 under the influence of the suction through the conduit 11. The spring 18 bears against a seat 19 which may be adjusted by means of a screw 20 and lock nut 21 to vary the amount of suction necessary to raise the valve 12. The bottom face of the valve 12 is formed with a V-shaped channel 22 extending diametrically across the same for metering the flow of air into the manifold through the conduit 9.

With proper selection or adjustment of the springs 17 and 18, the valve 12, when the engine is idle, will rest in such a position that the vertex of the V substantially coincides with the lower edge of the relief channel. As the valve is raised higher and higher and the flow of air into and through the conduit 9 increases, an adjustable stop is provided to positively limit the upward movement of the valve 12 at the point where the maximum amount of air may be admitted to the manifold which will produce a combustible mixture. This stop is shown in the form of an adjustable screw 23 and lock nut 24.

In furnishing valves in accordance with the invention for connection with automobile engines of various makes, it may be advisable to have several springs 17, 18 of different size or strength so that the proper selection and adjustment may be made in accordance with the characteristics of the various engines. Also, for the best results, some engines will require a valve with a wider V-shaped channel than others. These different valves may all be made so that they may be used interchangeably in the same cylinder.

In installing the air inlet valve the springs will first be adjusted to obtain the best performance at the lower speeds. The stop 23 will then be adjusted so that at the highest speed, with the valve 12 at its highest point, the cylinders of the engine will receive the highest percentage of air compatible with complete combustion.

The metering of the air through the V-shaped channel will hold the valve comparatively steady under all operating conditions and the spring 17 will have a cushioning effect as the valve is lowered by a relief of the vacuum in the manifold.

While I have shown and described in detail the preferred form of the invention, it is to be understood that the same is capable of various modifications within the scope of the claim appended hereto.

What I claim is:

In combination, a valve chamber of substantially uniform cross-section, a piston valve guided for reciprocation therein, said chamber having an intermediate side port normally covered by said valve, an air inlet port at one end and a suction port at the other end through which suction may be exerted to shift the valve to uncover the side port, thereby opening communication between the air inlet port and the side port, an expansible coil spring, a head in said chamber between which and the valve said coil spring is seated to resist the shifting of the valve, a screw-threaded adjustment for said head to vary the tension of the spring, and a stop inside the spring having a screw-threaded adjustment in the valve and engageable with said head to adjustably limit the maximum shifting movement of the valve.

MARION MALLORY.